Patented Mar. 11, 1947

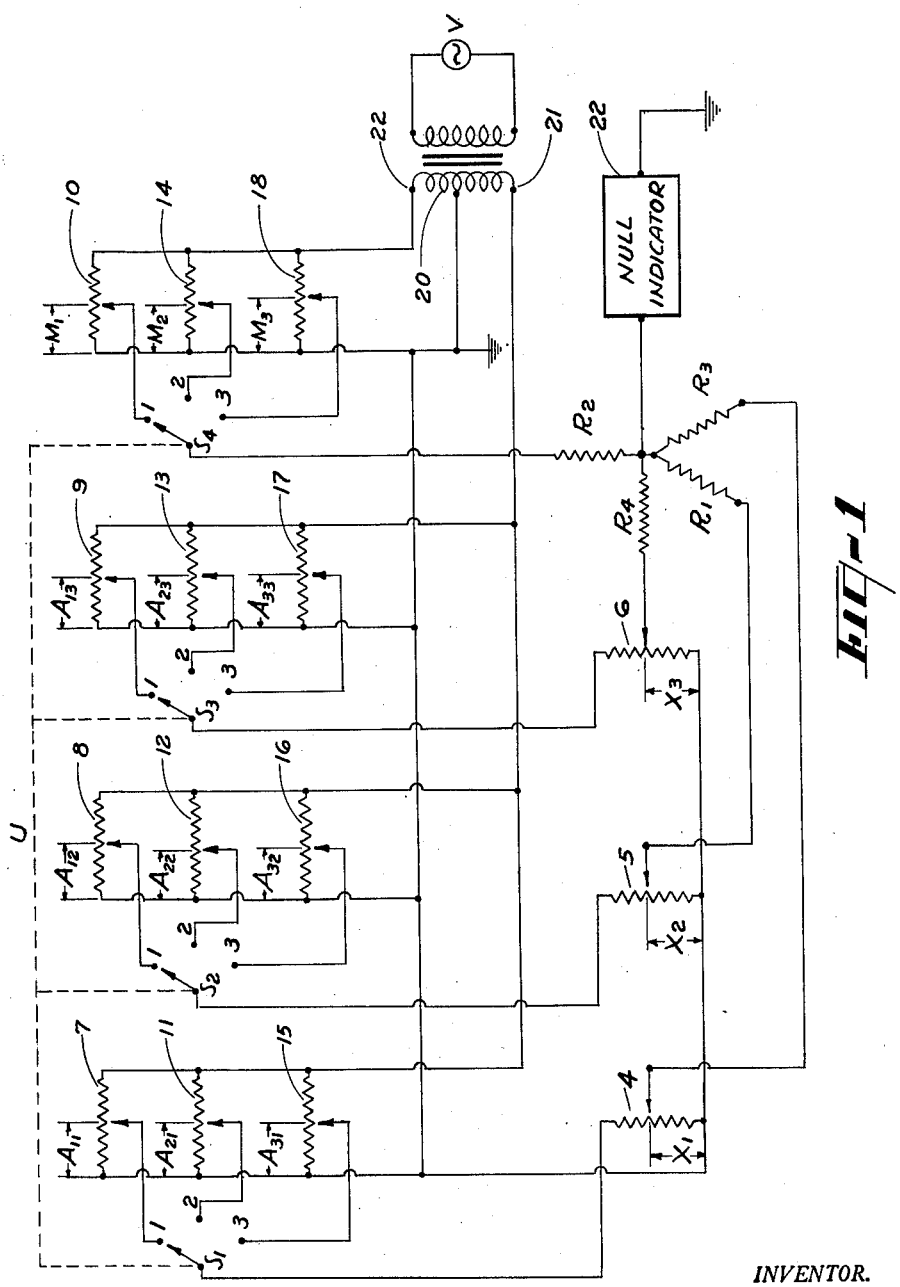

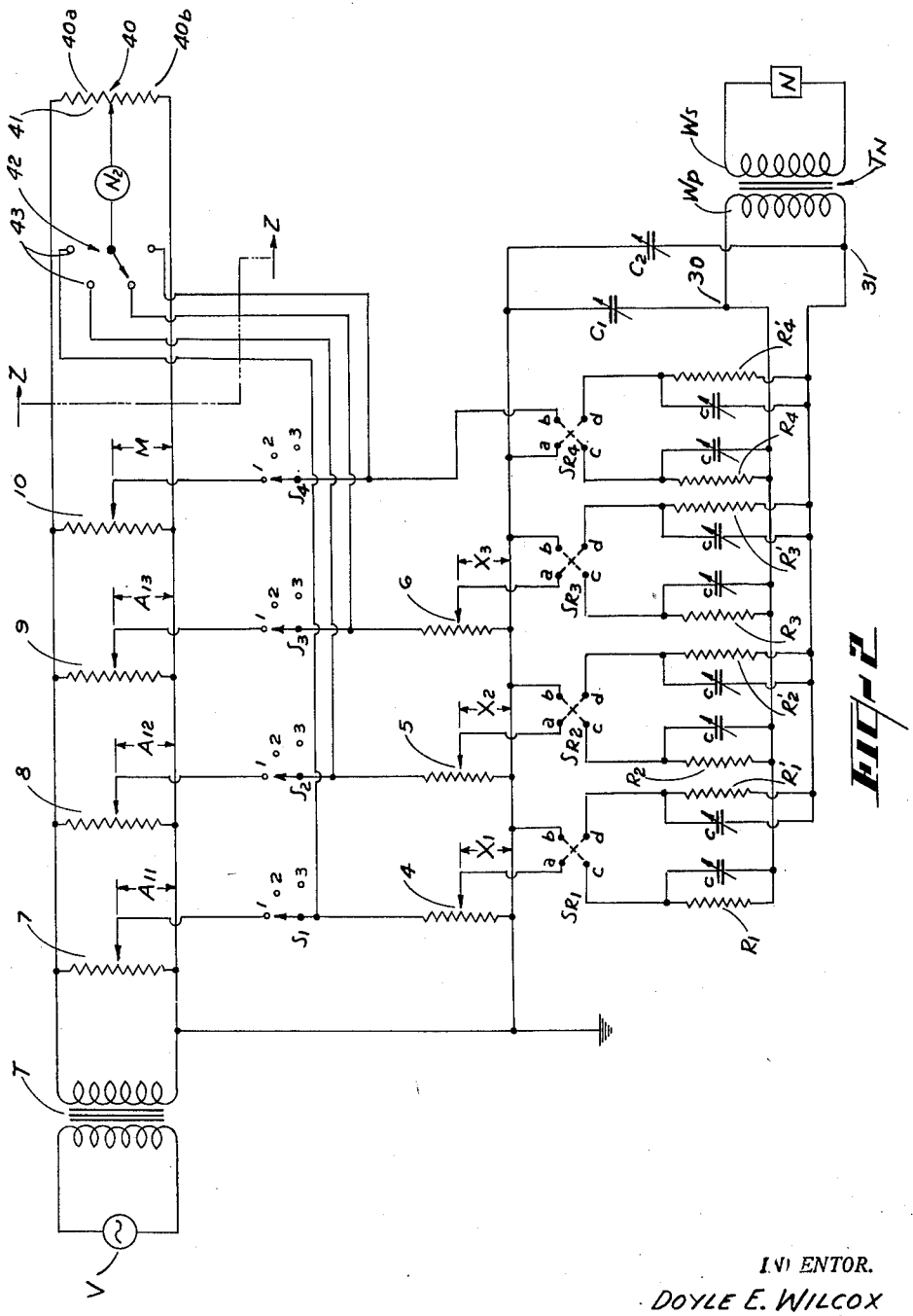

2,417,098

UNITED STATES PATENT OFFICE 2,417,098

COMPUTER

Doyle E. Wilcox, Pasadena, Calif., assignor to Consolidated Engineering Corporation, Pasadena, Calif., a corporation of California Application September 5, 1945, Serial No. 614,550

10 Claims. (Cl. 235—61)

This invention relates to electrical addition systems and more particularly to systems for indicating voltage sums by the use of electrical impedance elements. The principal object is to provide an electrical system for indicating the equality of sums of voltages without errors.

In the copending applications of Clifford E. Berry, Serial No. 561,192, filed October 31, 1944, and Serial No. 610,457, filed Aug. 13, 1945, executed August 7, 1945, assigned to the same assignee as the present application, there is described an electrical addition system adapted to add a plurality of voltages and to indicate when the addition is properly made. The said Berry addition system is shown as part of an electrical computing system for solving simultaneous equations. The quantities added in the equation are set up on suitable electrical networks for that purpose, and the electrical voltages representing the quantities are then added by the addition system in accordance with the equation, a suitable indication being provided when the addition has been made.

The electrical quantities to be added are taken as voltages across an impedance or potentiometer, which are individually applied to relatively high impedances or resistances; and the resistances or high impedances are together applied to a null indicator which indicates by its reading the condition of equality of the voltage sums in accordance with the equation.

In that arrangement, the voltages for operating the computing system are provided by a balanced source of A. C. voltage. Negative and positive signs of the added quantities are provided for by applying the operating voltage to the corresponding network from one side or the other of the balanced voltage supply source. In its operation there have sometimes crept into the results some slight errors arising from phase shift in the power transformer and circuit with variations in the applied load at different adjustments of the network elements.

According to my present invention, I provide a circuit arrangement making use of the fundamental addition circuit shown in the Berry applications, but providing means whereby the voltages applied to the null indicator correspond in phase as well as in amplitude, in consequence of which variations due to circuit loading conditions do not affect the null reading. More particularly, I provide a balanced arrangement of the resistances or impedances of the addition system, with reference to the null indicator.

I make provision for the positive and negative signs in the equation by the provision of switching means for switching the voltages representing the quantities from one side to the other of the null indicator in accordance with the mathematical signs. By this expedient those circuit elements whose output voltages are to be added may be connected in parallel, and changes in load on the power supply do not have the effect of disturbing the null indication.

As a refinement, I provide suitable shunting capacities across the resistors in the addition circuit for balancing the stray capacities.

The foregoing and other features will be better understood from the following detailed description taken in conjunction with the accompanying drawings of which:

Fig. 1 shows a system of the type disclosed in the Berry application Serial No. 561,192, in which voltages are added; and Fig. 2 shows an electrical addition system in which voltages are added according to my invention.

Fig. 1 shows an electrical computing system of the type shown in the said Berry application Serial No. 561,192 and is described briefly here for the purpose of illustrating an application of my novel addition system. The system is adapted to solve for the three unknowns $X_1$, $X_2$ and $X_3$ in the following simultaneous equations:

$$A_{11}X_1 + A_{12}X_2 + A_{13}X_3 = M_1 \quad (1)$$
$$A_{21}X_1 + A_{22}X_2 + A_{23}X_3 = M_2 \quad (2)$$
$$A_{31}X_1 + A_{32}X_2 + A_{33}X_3 = M_3 \quad (3)$$

in which all of the quantities except $X_1$, $X_2$ and $X_3$ are known. The unknown quantity $X_1$ is represented by the proportion of the voltage across potentiometer 4 which exists between ground and the tap on the potentiometer. The unknown quantity $X_2$ is represented by the proportion of the voltage across potentiometer 5, which exists between ground and the potentiometer tap. The unknown quantity $X_3$ is represented by the proportion of the voltage across potentiometer 6 which exists between ground and the potentiometer tap.

The set of potentiometers 7, 8, 9 and 10 are for the known quantities of Equation 1, the quantity $A_{11}$ being represented by the proportion of the voltage across potentiometer 7 between the tap and ground, and the other known quantities being similarly marked on their respective potentiometers. In similar fashion, the set of potentiometers 11, 12, 13 and 14 represent the known quantities of Equation 2, and the set of potentiometers 15, 16, 17 and 18 are for the known quantities in Equation 3 as marked on the potentiometers.

Four multiple switches, $S_1$, $S_2$, $S_3$ and $S_4$ are used, each having three contact points 1, 2 and 3. The switches are adapted to be thrown in unison by a single control member U so that all the switch points are on either contact 1, or 2, or 3. When the switches are thrown to their contacts 1, only Equation 1 is being computed, and similarly when the switches are thrown to contacts 2 and 3, only Equation 2 or 3, respectively, is being considered.

Assume now that the switches are thrown to their contacts 1. The alternating voltage from source V is applied to the primary 19 of the input power transformer and the output voltage is taken from secondary coil 20 having the output terminals 21 and 22. The coil 20 has its midpoint grounded; and the voltage is taken from the transformer either between terminal 21 and ground or between terminal 22 and ground. Potentiometers 7, 8 and 9 are connected in parallel across the lower half of coil 20, that is, between ground and terminal 21; while potentiometer 10 is connected across the upper half of coil 20, between ground and terminal 22. Thus the voltage impressed on potentiometer 10 is 180° out of phase with the voltage impressed on potentiometers 7, 8 and 9; and this phase reversal takes care of the fact that $M_1$, set up on potentiometer 10, is on the opposite side of the equality sign from the other quantities set to provide voltages between ground and the respective taps which are proportional to the numerical value intended to be set up. In other words, the tap is set so that the ratio of the voltage between ground and the tap to the total voltage across the potentiometer is equal to the known A or M value. For this purpose it is convenient to consider the A and M values as decimal quantities which are fractions of unity; and if they are not already fractional values the equations may all be multiplied through by a constant which will make them all fractions. Then the said voltage ratios can be set to be equal numerically to the corresponding fractions. If the voltage across all the A potentiometers (and the M potentiometers) be made 1 volt, for example, the fraction will be numerically equal to the voltage between ground and the tap of the respective potentiometer.

By reason of the connection of each tap through the respective one of the switches $S_1$, $S_2$, $S_3$ and $S_4$, the voltages representing the A coefficients are applied across the respective potentiometers 4, 5 and 6. In consequence, the proportion of the voltage between ground and the taps of these latter potentiometers will represent the unknown quantities $X_1$, $X_2$ or $X_3$ by which the known coefficients are multiplied in the equation. Considering now the first of the equations, $$A_{11}X_1 + A_{12}X_2 + A_{13}X_3 = M_1$$

it is only required that the unknown quantities $X_1$, $X_2$ and $X_3$ be mutually adjusted so that the sum of voltages representing three quantities at the left of the equality sign be equal to the quantity at the right of the equality sign. This is done by use of the addition system comprising the equal resistors $R_1$, $R_2$, $R_3$ and $R_4$. One side of each of these four resistors is connected to the respective taps of the potentiometers 4, 5, 6 and 10. The opposite sides of the four resistors are connected together at the common terminal and to the null indicator 22. Whenever the null indicator indicates zero voltage, Equation 1 is satisfied.

Although there are shown in Fig. 1 three potentiometers (4, 5 and 6) for the unknowns and four R resistors ($R_1$, $R_2$, $R_3$ and $R_4$) for performing the addition, it will be recognized that there will be as many of the X potentiometers as there are unknowns. If there are $n$ unknowns (and equations) there will be $n$ unknown potentiometers and $n+1$ of the R resistors.

The resistors $R_1$, $R_2$, $R_3$ and $R_4$ with their associated respective voltage sources, namely potentiometers 4, 5, 6 and 10 constitute an addition network in which the resultant voltage across the parallel branches, that is across the null indicator 13 is given by the equation:

$$E_r = \frac{e_1 + e_2 + e_3 + \ldots e_n}{n}$$

where, $E_r$ is the resultant voltage across the null indicator, and
$e_1$ is the voltage between ground and the tap of potentiometer 4,
$e_2$ is the voltage between ground and the tap of potentiometer 5,
$e_3$ is the voltage between ground and the tap of potentiometer 6,
$e_n$ is the voltage between ground and the tap of the nth potentiometer.

The summation is properly made according to the equation, when $E_r$ is zero as indicated by a zero reading on the null indicator.

In order to have this summation equation hold accurately at different settings of potentiometers 4, 5, 6 and 10 the impedance of these potentiometers should be made negligibly small relative to the impedance of $R_1$, $R_2$, $R_3$ and $R_4$. A convenient relationship is for $R_1$ to $R_4$ each to be about one thousand times greater than the impedance of any of potentiometers 4, 5, 6 and 10.

Although the system of Fig. 1, as shown, is adapted to solve for the equation when all of the quantities of the equation are of a positive value, it can easily be adapted to take care of any negative quantities simply by connecting the ungrounded side of the A potentiometer corresponding to that negative quantity from the side of transformer winding 20 on which it is now shown, to the other side. Thus, if quantity $A_{13}$, for example, is a negative number, the ungrounded side of potentiometer 9 instead of being connected to terminal 21 would be connected to terminal 22. This would shift its phase by 180°, so that it corresponds to a negative number. This same switching could be done with any of the known potentiometers and if desired, a suitable switch could be arranged for the purpose.

Such switching from one side to the other of the transformer secondary introduces irregularities due to phase shift and other unbalances, however, which tend to impair the accuracy. Even without the switching from the one side to the other of the balanced transformer, some irregularities are introduced by the changes in loading on the potentiometer by changes in the taps on the potentiometers.

According to my invention, I avoid errors due to such irregularities by the use of an addition system set up as shown in Fig. 2. In Fig. 2 the potentiometers 4, 5, 6, 7, 8, 9 and 10 correspond to the same numbered potentiometers in Fig. 1; the voltage source V corresponds to the voltage source V in Fig. 1, and the transformer T corresponds to the power transformer in Fig. 1. In Fig. 2, only those known potentiometers, 7, 8, 9 and 10 for Equation 1 are shown, it being understood that the corresponding known potentiometers for the other equations may be present and connected in circuit with their corresponding X potentiometers by their switches $S_1$, $S_2$, $S_3$ and $S_4$, as indicated.

The voltages to be added according to the summation called for by Equation 1 are the voltages at the taps of potentiometers 4, 5, 6 and 10, these being the same voltages as are added in Fig. 1. In Fig. 2, the summation is made by use of resistors $R_1$, $R_2$, $R_3$ and $R_4$ the same as by use of the same designated resistors in Fig. 1. This summation is applied to the null indicator N, but in a somewhat different manner from the arrangement of Fig. 1. Instead of there being only one R resistor such as $R_1$, $R_2$, etc., attached to each of the potentiometers 4, 5, etc., there are two of these R resistors. The potentiometer 4 for example, has a resistor $R_1$ connectable to its tap and another resistor $R_1'$ connectable to the grounded terminal. Likewise, the potentiometers 5, 6 and 10 have connected to their grounded terminals resistors $R_2'$, $R_3'$, $R_4'$, respectively, these being each equal to $R_2$, $R_3$ and $R_4$.

Accordingly, there is a pair of the high resistors, that is, an R and R' resistor, for each X potentiometer, these being on each side of the tapped off portion of the voltage from the X potentiometer. These, instead of being attached directly to the null indicator N, are attached on opposite sides of the primary winding $W_p$ of transformer $T_n$, the secondary $W_s$ of which is connected across the null indicator N.

It will be observed that the R and R' resistors are not connected directly to their corresponding unknown potentiometers, but through the respective reversing switches $S_{R_1}$, $S_{R_2}$, $S_{R_3}$ or $S_{R_4}$. Each of the reversing switches comprises two upper contacts $a$ and $b$, respectively, and two lower contacts $c$ and $d$, respectively. When the reversing switches are all thrown to their upper pair of contacts $a$, $b$, the R resistor of the pair is connected to the upper side of the primary of the transformer $T_n$, and the R' of the pair is connected to the lower terminal of the transformer winding. When on the other hand, any of the reversing switches is thrown to its lower contact $c$, $d$, respectively, the polarity of the voltage from the respective unknown potentiometers is applied to the transformer $T_n$ in the opposite polarity.

The summation called for by the equation is had when the two terminals 30 and 31 of the primary $T_p$ are at the same voltage, no current flows through the transformer. This condition will be indicated by a null reading on null indicator N connected across the secondary $T_s$. Under this condition, the sum of the voltages brought to terminal 30 by resistors $R_1$, $R_2$, $R_3$ and $R_4$ is equal to the sum of the voltages brought to terminal 31 by resistors $R_1'$, $R_2'$, $R_3'$ and $R_4'$.

It will be noted that the connections are arranged to provide the summation called for by Equation 1. Thus, all three of the unknown quantities $X_1$, $X_2$ and $X_3$ are at the left of the equality sign, and with the $S_R$ reversing switches all in their upper positions, as shown, the resistors $R_1$, $R_2$ and $R_3$, from the taps of the unknown potentiometers 4, 5 and 6 are brought to terminal 30. The tap for quantity $M_1$ set up on potentiometer 10 however, is brought to resistor $R_4'$, which goes to the other terminal 31 of the transformer. This is in accord with the equation wherein the $M_1$ quantity is at the righthand side of the equality sign. Thus, the connections are proper to equate the sum of the quantities at the left of the equality sign to the quantity at the right of the equality sign.

In an analogous manner, the resistors $R_1'$, $R_2'$ and $R_3'$ from the ground side of the unknown potentiometers are all brought to terminal 31 of the transformer, while resistor $R_4$ from the ground side of the $M_1$ potentiometer is brought to the opposite terminal 30, thus establishing the equality called for by the equation for the ground side of the system.

If any of the quantities in the equation is a negative value instead of the positive values shown in the equation, this negative sign is easily taken care of by reversing the corresponding $S_R$ switch. Thus, if the coefficient of $X_3$ be a negative number, the switch $S_{R_3}$ connected with potentiometer 6 is thrown to the down position, thereby reversing the polarity of the voltages put on the respective resistors $R_3$ and $R_3'$.

Further refinements of my system are the provision of trimmer condensers for balancing the capacities across the resistors and to ground. A trimmer condenser $C_1$ is connected from terminal 30 to ground, and a similar trimmer condenser $C_2$ is connected from terminal 31 to ground; these may be adjusted to balance the two sides of the primary $T_p$ with reference to ground.

Similarly, a trimmer condenser $C_r$ is connected across each of the resistors $R_1$, $R_2$, $R_3$, $R_4$ and $R_1'$, $R_2'$, $R_3'$ and $R_4'$. Adjustment of these trimmer condensers enables the capacity across each of the resistors to be made the same.

The A values can be set up on the respective A potentiometers in any convenient manner. For example, if the voltage of source V be fixed at one volt, and if a voltmeter be connected between ground and each A potentiometer tap, the tap is set so that the proportion of the voltage across the entire potentiometer which lies between ground and the tap is equal to the numerical value of the A in the equation, and this numerical value will be read directly on the meter. For example, if the value of $A_{11}$ be .6291, and if the voltage across potentiometer 7 be one volt, the tap of the potentiometer should be moved so that the voltage between ground and the tap appears on the meter as .6291 volt.

A more convenient and more accurate way of setting up the A quantities, however, is the arrangement shown in Fig. 2 to the right of the broken line Z—Z. This Wheatstone bridge arrangement comprises a potentiometer 40 having the two bridge arms 40a and 40b separated by the tap 41 of the potentiometer. A null indicator $N_2$ is connected to this potentiometer tap and the other side of the null indicator is connected to a selector switch 42 adapted to connect with any one of a series of taps 43. Each of the selector switch taps connects to an individual one of the taps of potentiometers 7 to 10. Thus, the other two arms of the Wheatstone bridge are composed of the portions on either side of the potentiometer tap of whichever of potentiometers 7 to 10 is in circuit. The tap 41 on potentiometer 40 is moved to tap off between ground and tap 41 the amount of the voltage bearing the ratio to the total voltage across the potentiometer 40 which is equal to the particular A number to be set up. If this A number is being set up for example on potentiometer 7, the selector switch is turned to its uppermost switch point 43, and then the tap of potentiometer 7 is moved until a null reading is had on null indicator $N_2$. This null reading indicates that the voltage on the tap of potentiometer 7 is the same as that on the tap of potentiometer 40, and therefore is the required A value. This same procedure can be followed to set the taps on each of the other potentiometers 8, 9 and 10. As potentiometer 40 is not loaded, its increments of resistance are directly proportional to its increments of voltage. Accordingly, a scale may be placed on potentiometer 40 to read directly the ratio of the voltage on the tap to the total voltage across the potentiometer, and thus read directly the numbers to be set up.

As the X potentiometers are not appreciably loaded (since resistors $R_1$, $R_2$, $R_1'$, $R_2'$, etc. are relatively high) the increments of impedance on these potentiometers are substantially proportional to the increments of voltage. Accordingly, a scale can be fixed to each of these potentiometers on which the position of the tap will read directly the ratio which the voltage from ground to the tap bears to the total voltage across the potentiometer. The X value set up can accordingly be read directly on the scale.

A numerical example showing the way in which solutions for simultaneous equations may be made on the computing system is given as follows wherein Equations 4, 5 and 6 are the same as the Equations 1, 2, and 3, respectively, but with specific numbers for the known values. In making this solution, it is assumed that the system of Fig. 2 is being used and that selector switches $S_1$, $S_2$, $S_3$, $S_4$ have connected to their taps 2 and 3, the corresponding A potentiometers shown connected to these taps in Fig. 1. The subscript $n$ stands for the equation being considered. Thus when considering the first equation $A_{n1}$ is $A_{11}$, $A_{n2}$ is $A_{12}$ and $A_{n3}$ is $A_{13}$; and when considering the second equation, $A_{n1}$ is $A_{21}$, $A_{n2}$ is $A_{22}$, etc.

Let the set of equations to be solved be:

$$2.0000X_1 + .0390X_2 + .0086X_3 = .0602 \quad (4)$$
$$0X_1 + 3.0000X_2 + .1428X_3 = 1.2543 \quad (5)$$
$$1.0000X_1 + .6341X_2 + .1512X_3 = .3565 \quad (6)$$

In order to reduce all quantities to unity or less, the first equation may be divided by 2, the second by 3, and the third by 1. These operations give a modified set of equations, which however, are satisfied by the same set of X values as the original set.

$$1.0000X_1 + .0195X_2 + .0043X_3 = .0301 \quad (7)$$
$$0X_1 + 1.0000X_2 + .0476X_3 = .4181 \quad (8)$$
$$1.0000X_1 + .6341X_2 + .1512X_3 = .3565 \quad (9)$$

The following table summarizes the operation of the computer in solving these equations. The first column gives the number of the cycle of operation, one cycle being defined as the process of solving each of the equations once in the manner previously indicated. The second column gives the number of the equation being solved, and the next four columns show the values of the A and M coefficients corresponding to the particular equation. The last three columns give the X approximations existing at that particular point in the operation, and the X which is solved for is underlined. It should be noted that in this example, the solutions were initiated by arbitrarily setting the $X_2$ and $X_3$ potentiometers at zero and then solving for $X_1$:

| Cycle of operation | Equation being solved | A coefficients | | | $M_n$ | X approximations | | |
|---|---|---|---|---|---|---|---|---|
| | | $A_{n1}$ | $A_{n2}$ | $A_{n3}$ | | $X_1$ | $X_2$ | $X_3$ |
| 1 | (7) | 1.0000 | 0.0195 | 0.0043 | 0.0301 | 0.0301 | 0 | 0 |
| | (8) | 0 | 1.0000 | .0476 | .4181 | .0301 | .4181 | 0 |
| | (9) | 1.0000 | .6341 | .1512 | .3565 | .0301 | .4181 | .4090 |
| 2 | (7) | 1.0000 | .0195 | .0043 | .0301 | .0200 | .4181 | .4090 |
| | (8) | 0 | 1.0000 | .0476 | .4181 | .0200 | .3986 | .4090 |
| | (9) | 1.0000 | .6341 | .1512 | .3565 | .0200 | .3986 | .5564 |
| 3 | (7) | 1.0000 | .0195 | .0043 | .0301 | .0220 | .3986 | .5564 |
| | (8) | 0 | 1.0000 | .0476 | .4181 | .0200 | .3916 | .5564 |
| | (9) | 1.0000 | .6341 | .1512 | .3565 | .0200 | .3916 | .5866 |
| 4 | (7) | 1.0000 | .0195 | .0043 | .0301 | .0200 | .3916 | .5866 |
| | (8) | 0 | 1.0000 | .0476 | .4181 | .0200 | .3900 | .5866 |
| | (9) | 1.0000 | .6341 | .1512 | .3565 | .0200 | .3900 | .5900 |

In this particular problem, four cycles of operation were required to reach the final answers which are:

$$X_1 = .0200$$
$$X_2 = .3900$$
$$X_3 = .5900$$

In the foregoing problem, the A and M values set up on the computer are voltage ratios; that is, the coefficient 1.0000 for the $A_{n1}$ value in Equation 7 means that the tap of potentiometer 7 is set at the top of its potentiometer, so as to tap off the entire voltage across the potentiometer, the .0195 value for $A_{n2}$ means that the tap of potentiometer 8 is set at .0195 of the total voltage across potentiometer 8, etc., etc. The final solution, .0200 for $X_1$ was found by ascertaining that after the final cycle of operation, the tap of potentiometer 4 was set on the potentiometer to tap off .0200 of the total voltage across the potentiometer, etc., etc.

The total impedances of the potentiometers and resistances are not critical. It has been found that the following set of values can conveniently be used and preferably they are made to be as close as possible to a pure resistance:

| Potentiometer and impedance No. | Value of impedance |
|---|---|
| Potentiometers 4, 5, 6 | 1,000 ohms, each. |
| Potentiometers 7, 8, 9, 10 | 1,000 ohms, each. |
| Resistances $R_1$, $R_2$, $R_3$, $R_4$, $R_1'$, $R_2'$, $R_3'$, $R_4'$ | 500,000 ohms, each. |
| Potentiometer 40 | 1,000 ohms. |

It will be recognized from the foregoing description that by my invention I have provided an improved electrical computing system which arrives at solutions with a high degree of accuracy, inasmuch as errors due to unbalances in the alternating current system are avoided.

I claim:

1. An electrical summation network, comprising a plurality of voltage sources, a null voltage indicating means and a pair of impedance elements connected from each source to the indicating means, one of each pair being connected from one side of its associated source to one side of the indicating means, and the other of each pair being connected from the other side of its associated source to the other side of the indicating means, the impedances of said impedance elements being of equal magnitude.

2. A network according to claim 1, in which the magnitude of the impedance of each impedance element is high in comparison with the impedance of the sources.

3. An electrical summation network comprising a plurality of voltage sources having a pair of output terminals, one of the output terminals of each source being connected together at a common junction, a null voltage indicating means, and a pair of impedance elements connected from each source to the indicating means, one of each pair being connected from the common junction to one side of the indicating means, and the other of each pair being connected from the other terminal of the associated source to the other side of the indicating means, the impedances of said impedance elements being of equal magnitude.

4. An electrical summation network comprising a plurality of voltage sources, a null voltage indicating means, a pair of impedance elements connected from each source to the indicating means, one of each pair being connectable from one side of its associated source to one side of the indicating means, and the other of each pair being connected from the other side of the associated source to the other side of the indicating means, said impedances being of equal magnitude, and a reversing switch in series with each of the impedance elements for reversing the polarity of each of the elements with respect to its associated source.

5. An electrical summation network comprising a plurality of voltage sources, a null voltage indicating means comprising a transformer having a primary and a secondary winding and a null indicator in circuit with the secondary winding, and a pair of impedance elements connected from each source to the primary winding, one of each pair being connected from one side of its associated source, to one side of the primary winding, and the other of each pair being connected from the other side of its associated source to the other side of the primary winding, the impedances of said impedance elements being of equal magnitude.

6. An electrical summation network comprising a plurality of voltage sources, a null voltage indicating means comprising a transformer having input terminals and output terminals and a null indicator connected in circuit with the output terminals, a pair of impedance elements connected from each source to the input terminals, one of each pair being connected from one side of its associated source to one of the input terminals, and the other of each pair being connected from the other side of its associated source to the other of the input terminals, the impedances of the impedance elements being of equal magnitude, and a trimmer condenser connected from each of the input terminals of the transformer to the common terminal.

7. An electrical summation network comprising a plurality of voltage sources, a null voltage indicating means, a pair of impedance elements connected from each source to the indicating means, one of each pair being connected from one side of its associated source to one side of the indicating means, and the other of each pair being connected from the other side of its associated source to the other side of the indicating means, the impedances of said impedance elements being of equal magnitude, and a trimmer condenser connected across each impedance element.

8. An electrical summation network comprising a plurality of potentiometers arranged in parallel circuits with respect to each other, means for impressing an alternating voltage on the potentiometers and means for taking an output voltage from each of the potentiometers, one of the output terminals of each potentiometer being joined at a common terminal, and a pair of impedance elements connected from each potentiometer to the indicating means, one of each pair being connected from the common terminal to one side of the indicating means, and the other of each pair being connected from the remaining output terminal of its associated potentiometer to the other side of the indicating means, said impedance elements being of equal magnitude which is high relative to the impedance of the potentiometers.

9. An electrical summation network comprising a plurality of voltage sources, a null voltage indicating means and a pair of impedance elements connectable from each source to the indicating means, one of each pair being connectable from one side of its associated source to one side of the indicating means and the other of each pair being connectable from the other side of its associated source to the other side of the indicating means, the impedances of said impedance elements being of equal magnitude, and a double-pole, double-throw reversing switch in series with each pair of impedance elements to reverse their polarity with respect to the indicating means.

10. An electrical summation network comprising a plurality of potentiometers arranged in parallel circuits with respect to each other, means for impressing an alternating voltage on the potentiometers and means for taking an output voltage from each of the potentiometers, one of the output terminals of each potentiometer being joined at a common terminal and a pair of impedance elements connectable from each potentiometer to the indicating means, one of each pair being connectable from the common terminal to one side of the indicating means and the other of each pair being connectable from the remaining output terminal of its associated potentiometer to the other side of the indicating means, said impedance elements being of equal magnitude which is high relative to the impedance of the potentiometers, and a reversing switch in circuit with each pair of impedance elements to reverse its polarity with respect to the indicator.

DOYLE E. WILCOX.